US000002016H

(19) United States

(12) Statutory Invention Registration (10) Reg. No.: US H2016 H

Wicks et al. (43) Published: Apr. 2, 2002

(54) MONO-BLADE PHASE DISPERSIONLESS ANTENNA

(75) Inventors: Michael C. Wicks, Utica; Paul Van Etten, Clinton, both of NY (US)

(73) Assignee: The United States of America as represented by the Secretary of the Air Force, Washington, DC (US)

(21) Appl. No.: 06/841,376

(22) Filed: Mar. 5, 1986

(51) Int. Cl.[7] ..... H01Q 1/28; H01Q 1/36

(52) U.S. Cl. ..... 343/705; 343/908

(58) Field of Search ..... 343/705, 708, 343/794, 795, 807, 846, 899, 908

(56) References Cited

U.S. PATENT DOCUMENTS

| | | | | |
|---|---|---|---|---|
| 3,015,101 A | | 12/1961 | Turner et al. | 343/848 |
| 3,509,465 A | | 4/1970 | Andre et al. | 343/895 X |
| 3,618,104 A | | 11/1971 | Behr | 343/745 |
| 3,680,127 A | | 7/1972 | Richard | 343/708 |
| 4,370,660 A | * | 1/1983 | Fahmy | 343/795 |

FOREIGN PATENT DOCUMENTS

| | | | | |
|---|---|---|---|---|
| GB | 964458 | * | 7/1964 | 343/908 |

* cited by examiner

*Primary Examiner*—Daniel T. Pihulic

(74) *Attorney, Agent, or Firm*—Donald J. Singer; William G. Auton

(57) ABSTRACT

A Mono-Blade Antenna is disclosed which operates over many octaves of bandwidth. Electromagnetic waveforms may be transmitted and received with multi-decade bandwidth using: a metal ground plane, a Mono-Blade Antenna element fixed above the ground plane, and a coaxial transmission line feed which is connected to the antenna element and the ground plane. The antenna element has three sections: a throat, a mouth, and a radial tip. The throat is comparatively narrow and serves as the element feed point by being connected to the center conductor of the coaxial cable. The mouth is the mid-section of the antenna element, which is the widest section of the blade. The tip of the blade is formed by an arc of approximately constant radius, which results in a low voltage standing wave ratio.

4 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Geometry of the Mono-Blade Antenna

Geometry of the Mono-Blade Antenna

The Mono-Blade Antenna & Its Image

The Dual Antenna to the Mono-Blade

Facimile of the Antenna Surge Impedance Through The Transmission Line and Antenna Details of Feeding the Mono-Blade Antenna With A Coaxial Transmission Line Geometry of the Mono-Blade Phased Array Antenna

MONO-BLADE PHASE DISPERSIONLESS ANTENNA

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to broadband antennas, and specifically to a Mono-Blade Dispersionless Antenna with multi-decade bandwidth (100 to 1).

Modern aircraft contain many separate antennas operating over many frequency bands. An example is the F-111 aircraft which has over 100 separate antennas. If a single antenna could be found that operates over many octaves of bandwidth, the new antenna could replace many of the antennas onboard these aircraft and result in savings in antennas cost, cabling cost, and maintenance cost.

The task of providing a single antenna which operates over many spans of bandwidth is alleviated, to some extent, by the systems of the following U.S. Patents, which are incorporated herein by reference:

U.S. Pat. No. 3,680,127 issued to D. J. Richard on Jul. 25, 1972;

U.S. Pat. No. 3,015,101 issued to E. Turner et al on Dec. 26, 1961

U.S. Pat. No. 3,509,465 issued to; Andre et al on Apr. 28, 1970; and

U.S. Pat. No. 3,618,104 issued to; L. Behr on Nov. 2, 1971.

U.S. Pat. No. 3,618,104 discloses a broadband low-profile circularly polarized antenna having a form factor comprising a cornucopia-shaped element. U.S. Pat. No. 3,509,465 discloses a tunnel diode amplifier integrated into a printed circuit equiangular spiral antenna in which the antenna elements are used as a portion of the amplifier transmission line.

U.S. Pat. No. 3,680,127 discloses a tunable omnidirectional antenna having two loaded, concentric, semicircular radiating members, U.S. Pat. No. 3,015,101 discloses a coplanar equiangular stub antenna with a folded over shorted base, the general configuration being that of a scimitar blade.

While the systems described above are exemplary in the art, the need remains to provide a multi-octave antenna element. The present invention is intended to satisfy that need.

SUMMARY OF THE INVENTION

The present invention comprises a Mono-Blade Dispersionless Antenna with a multi-decade bandwidth (100 to 1). The Mono-Blade Antenna consists of a metal blade element above a ground plane. The tip of the blade element is approximately a constant radius arc with the radius of the arc determining the surge impedance of the antenna. The Mono-Blade Antenna is fed with a coaxial transmission line which is secured to the ground plane.

It is an object of the present invention to provide a broadband antenna which transmits and receives multi-octave electromagnetic energy.

It is another object of the present invention to replace a number of different antennas with a single Mono-Blade Antenna which has multi-decade bandwidth.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a Mono-Blade Dispersionless Antenna with a multi-decade bandwidth (100 to 1).

Two popular broadband antennas which have bandwidths exceeding a decade are currently known in the art and are briefly reviewed. They are the log-periodic antenna and the cavity backed spiral antenna. In the past, these two antennas have been built with bandwidths exceeding a decade, while also achieving fairly decent spatial patterns and relatively good radiation efficiency. Generally speaking, these antennas have severe phase dispersion. That is, if the antenna is fed with a very short burst of an RF carrier (less than several cycles), the electromagnetic waveform will contain severe time and phase dispersion, which causes the radiated waveform to be stretched out in time. Nondispersive broadband antennas are rarely known.

The present invention has several important properties: (1) the antenna has a large bandwidth, (2) the antennas has little or no time (phase) dispersion, (3) the input VSWR (voltage standing wave ratio) is extremely good (i.e., less than 1.2 to 1), (4) the antenna is relatively inexpensive to manufacture as compared to other types of broadband antennas, (5) the antenna can be employed in a phased array providing a large bandwidth, high gain and good directivity, (6) the antenna is a nonresonant structure unlike most other antennas, which contributes to its broadband nature.

Figure 1:
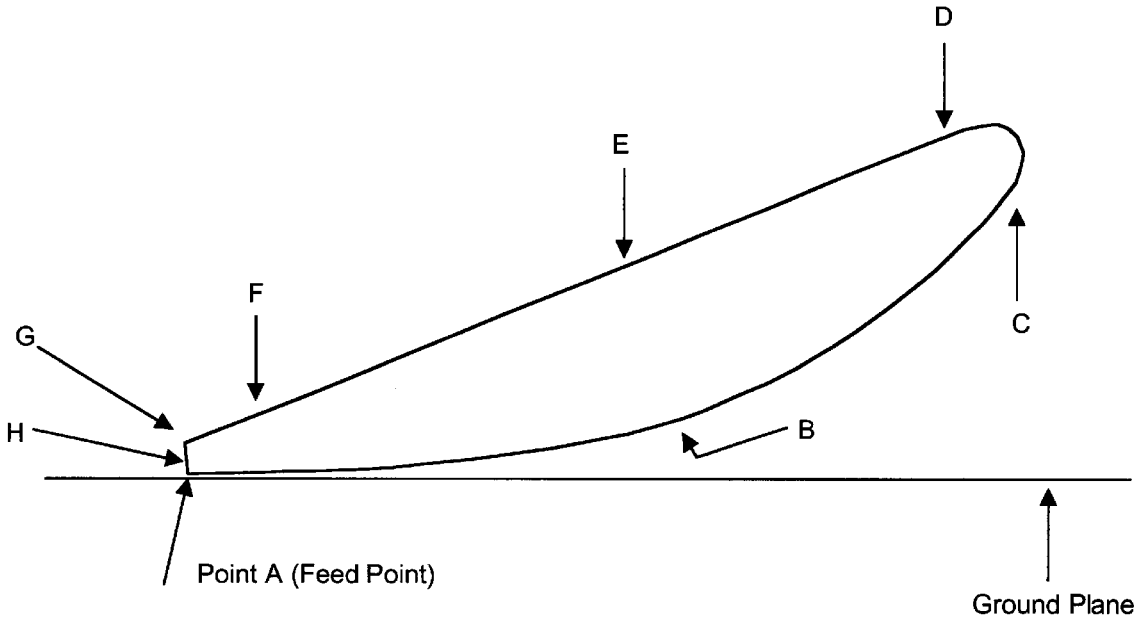
FIG. 1 is an illustration depicting the geometry of the Mono-Blade Antenna of the present invention.

FIG. 1 is an illustration of the Mono-Blade Antenna of the present invention. This antenna contains a blade A–H (with geometry described below) which is fixed over a metal ground plane and fed by a coaxial transmission line which is secured to the ground plane.

To understand the theory of operation of the antenna of FIG. 1, it is necessary to consider its dual antenna, which is constructed by employing Image Theory on the antenna of FIG. 1.

Figure 2A:
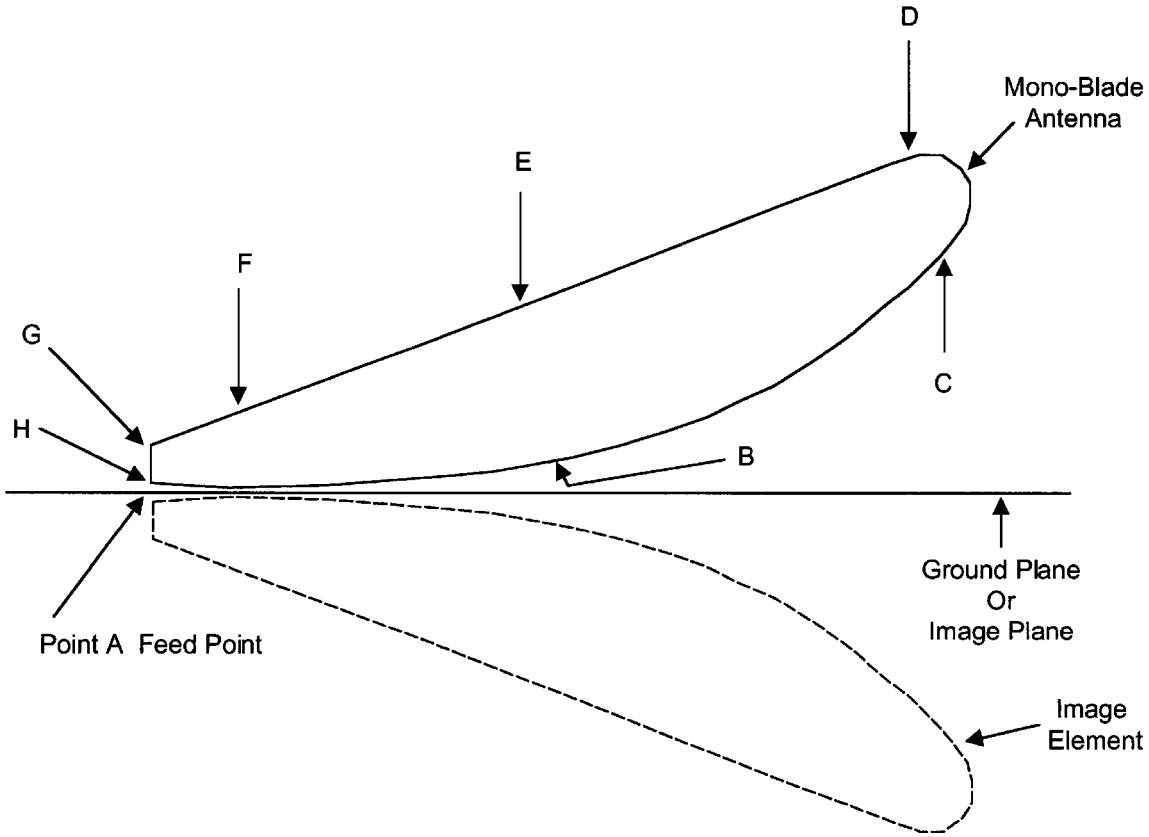
FIG. 2*a* is an illustration of the Mono-Blade Antenna of FIG. 1 and its image.
Figure 2B:
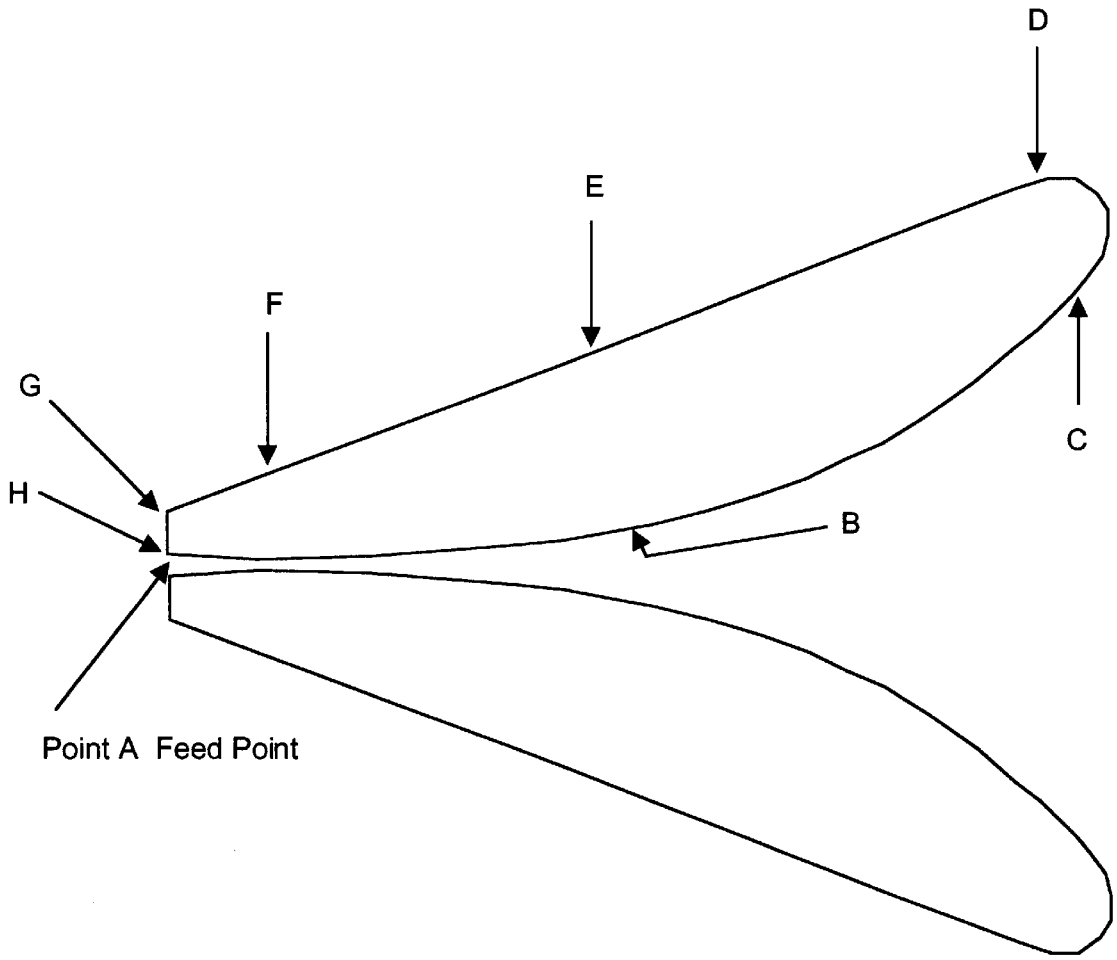
FIG. 2*b* is the dual antenna to the Mono-Blade Antenna of FIG. 1.

To construct the dual antenna, the mirror image of the metal blade element is constructed below the ground plane, then the ground plane (image plane) is removed (see FIG. 2*a*). The resulting antenna (see FIG. 2*b*) has electrical properties similar to the Mono-Blade Antenna. Consider the dual antenna in FIG. 2*b* to be a transmission line slot in a metal ground plane. The slot transmission line has a TEM mode of propagation. To a first approximation, the slot width increases logarithmically from the throat to the mouth of the antenna. The tip of the blade is approximately a constant radius arc. Because of stray capacity and fringing effects, the actual shape of the opening is determined by the antenna's surge impedance as described below.

If the dual antenna is fed with a 50 ohm coaxial transmission line, the width and height of the slot at point A (see FIG. 2*b*) is so designed, using standard transmission line design formulas, to force the surge impedance at point A to be exactly 50 ohms. This same requirement is imposed upon the Mono-Blade Antenna. In the initial design of the Mono-Blade Antenna the surge impedance is measured through the transmission line into the feed point of the antenna at point A, progressing through point B, through point C, onto point D, (see FIG. 1). The surge impedance may be measured with a Time Domain Reflectometer or other similar apparatus.

Figure 3:
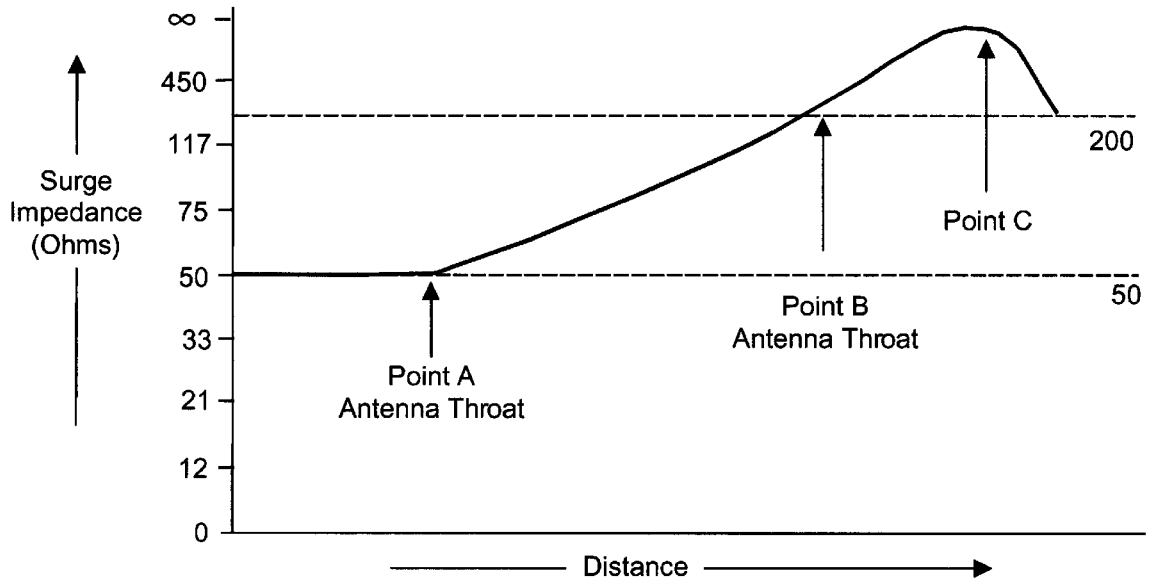
FIG. 3 is a facsimile of the antenna surge impedance through the transmission line and antenna.

A desired Time Domain Reflectometer display of the surge impedance is seen in FIG. 3. Here, the antenna is fed using a 50 ohm coaxial transmission line (for example), the surge impedance at point A of the antenna is 50 ohms and is linearly increasing to some nominal value, between 180 ohms and 230 ohms at the mouth of the antenna, which is point B in FIG. 1. Using a gradual change in the curvature, the geometry from point B to point C is approximately an arc of constant radius. The radius of the arc is an important design parameter which determines the slope of the surge impedance as seen in FIG. 3, going from point B (the antenna mouth) to point C. If the radius is too small, the slope will be excessive and provide unwanted reflections back to the input (or the feed point), thus causing a large input VSWR. On the other hand, if the radius is made too large, the physical size of the antenna will become excessive, making the antenna large and bulky. The design compromise which results in the configuration seen in FIG. 1 provides an overall tradeoff between antenna geometry, physical size, and a very good input VSWR. The physical shape of the blade from point C to point D is approximately an arc of constant radius; the geometry of the blade continuing from point D, to point E, to point F, to point G is relatively unimportant and is made a straight line for manufacturing ease. An extremely low input VSWR (less than 1.1 to 1) can be achieved by making the antenna long in the direction of propagation, whereas the input surge impedance is changing slowly with distance.

Figure 4:
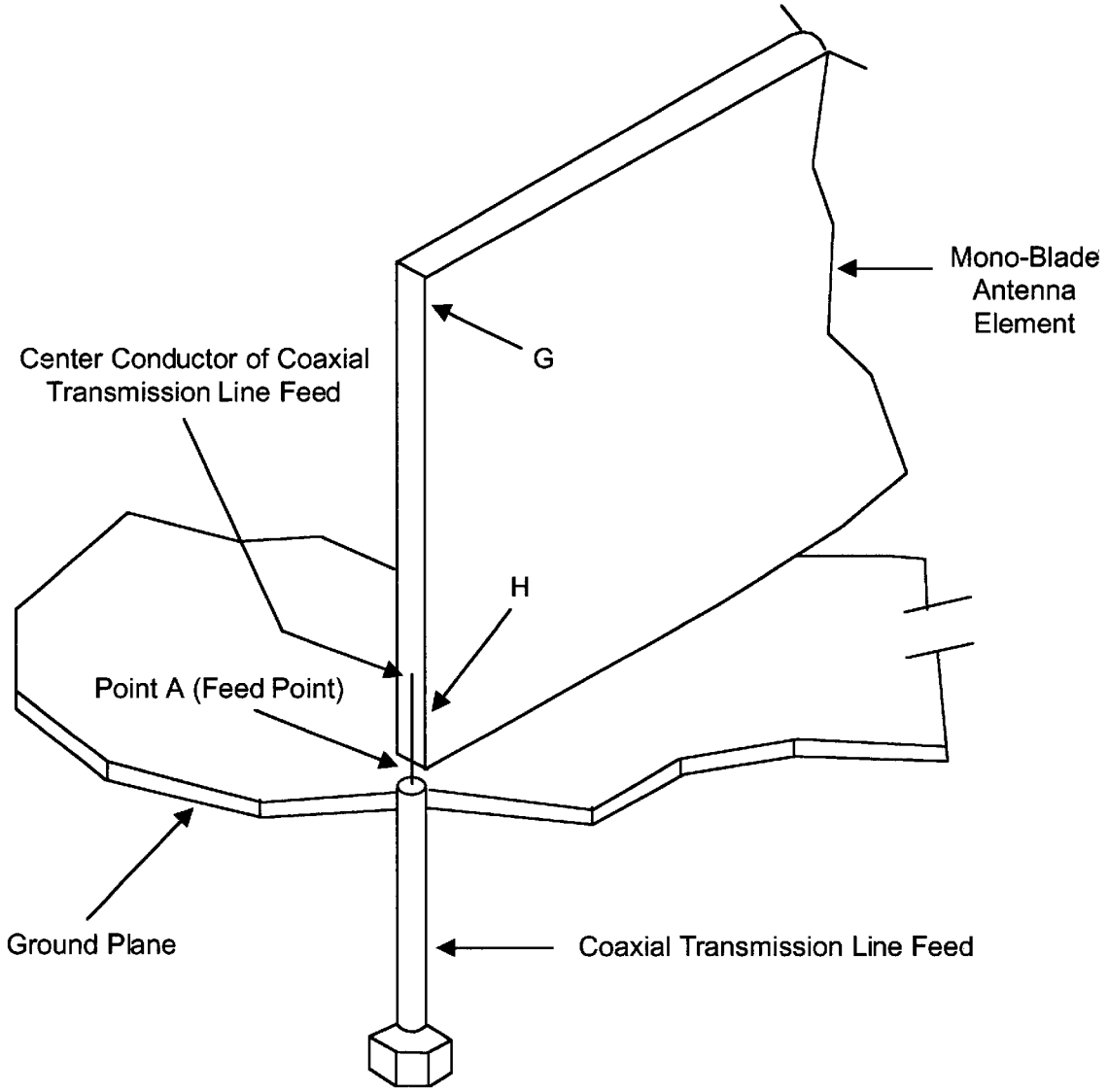
FIG. 4 is an illustration depicting the details of feeding the Mono-Blade Antenna.

The manner in which the Mono-Blade Antenna is fed with a coaxial transmission line is described with the aid of FIG. 4. Here the outer conductor of the coaxial transmission line is secured (possibly soldered) to the ground plane. The center conductor of the coaxial transmission line is attached to the blade at point H. Its exact position point is determined by inspecting the surge impedance employing the Time Domain Reflectometer, such that a "surge impedance bump" is trimmed out. To assure that the electromagnetic field is contained across the gap with little or no fringing, it is required that the distance from point G to point H be at least ten times the amount of the slot opening at point A. In practice, it is found that a ratio of 20 to 1 provides both a containment of fringing of the electric field lines, and also provides an antenna with mechanical rigidity.

Figure 5:
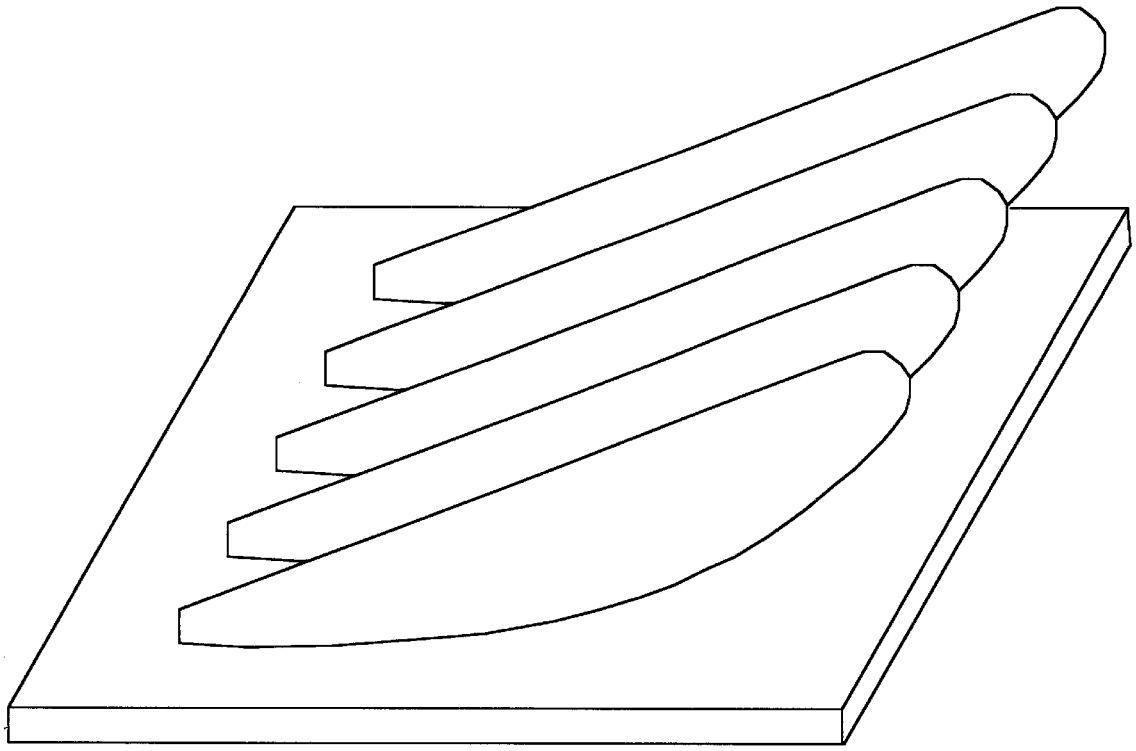
FIG. 5 is an illustration depicting the geometry of a Mono-Blade phased array antenna.

The manner in which the antenna is supported or attached to a structure can vary according to the particular application. The antenna should be mounted such that no metal be placed near the regions of point A, point B, point C, or point D in FIG. 1. The support structure is generally found to work well when the blade is secured anywhere along the position between points E and F to minimize interference. Also, the Mono-Blade Antenna can easily be employed in a phase array configuration, (see FIG. 5). Practically speaking, the Mono-Blade Antenna is superior to its dual antenna. Most important of all, the coaxial transmission line is the ideal feed structure for the Mono-Blade Antenna due to its geometry. A balanced transmission line feed would be required for the dual antenna, however, extremely broadbend baluns do not exist. Also, the Mono-Blade Antenna geometry is ideal for mounting on an aircraft body, (the aircraft body is the ground plane).

For a typical example, the Mono-Blade Antenna with the dimensions:

Blade Length: 22 inches

Mouth Opening: 7 inches

Blade Thickness: 0.1 inches has the measured performance parameters of:

Frequency: 8 GHz

Gain: 15.9 db

Vertical Beamwidth: 19 degrees

Horizontal Beamwidth: 50 degrees

VSWR: 1.2 to 1

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An antenna comprising:

a metal ground plane;

a Mono-Blade Antenna element fixed above said ground plane, said Mono-Blade Antenna having: a throat which serves as a feed point, a mid-section, which is the Mono-Blade Antenna section's widest point, and a tapered tip which has an arc of a constant radius; and a coaxial transmission line feed which has a central conductor connected to the throat of the antenna element and an outer conductor connected to the metal ground plane.

2. An antenna, as defined in claim 1, wherein the throat of the Mono-Blade Antenna element has a height which is at least ten times the Mono-Blade Antenna element's thickness at the feed point.

3. An antenna, as defined in claim 2, wherein said Mono-Blade Antenna element has a height of about twenty-two inches.

4. An antenna, as defined in claim 3, wherein said Mono-Blade Antenna element's thickness is about 0.1 inches.

* * * * *